United States Patent
Lin

(10) Patent No.: US 7,530,290 B2
(45) Date of Patent: May 12, 2009

(54) CRANK FOR CYCLES

(76) Inventor: Chang Hui Lin, No. 13, Ju Wei Lane, Gin Lin Tsuen, Siu Shui Haiang, Chang Hua Hsien (TW)

( * ) Notice: Subject to any disclaimer, the term of this patent is extended or adjusted under 35 U.S.C. 154(b) by 408 days.

(21) Appl. No.: 11/168,900

(22) Filed: Jun. 27, 2005

(65) Prior Publication Data
US 2006/0288817 A1 Dec. 28, 2006

(51) Int. Cl.
*B62M 3/00* (2006.01)
(52) U.S. Cl. .................................................. 74/594.1
(58) Field of Classification Search ............... 74/594.1, 74/594.4; 277/644, 648, 637, 630
See application file for complete search history.

(56) References Cited

U.S. PATENT DOCUMENTS

| 3,361,459 | A | * | 1/1968 | Marquis et al. ............. 403/165 |
| 4,034,575 | A | * | 7/1977 | Barth .......................... 464/73 |
| 4,121,474 | A | | 10/1978 | Arregui Suinaga ........ 74/217 B |
| 4,521,207 | A | | 6/1985 | Husted ........................ 474/56 |
| 4,882,945 | A | * | 11/1989 | Trevizo ..................... 74/594.3 |
| 5,440,950 | A | * | 8/1995 | Tranvoiz .................... 74/594.4 |
| 6,830,259 | B2 | * | 12/2004 | Jakovljevic ................. 280/261 |
| 2003/0188602 | A1 | * | 10/2003 | Lubanski ................... 74/594.4 |
| 2007/0204721 | A1 | * | 9/2007 | Dal Pra et al. ............. 74/594.1 |

* cited by examiner

*Primary Examiner*—Vicky A Johnson
(74) *Attorney, Agent, or Firm*—Charles E. Baxley

(57) ABSTRACT

A crank for bicycles or other cycling facilities includes an elongate shank having an orifice formed in one end, and a chamber formed by an upper wall and a lower wall, a gasket is engaged into the chamber via the orifice of the shank. The gasket is engaged between the walls of the shank, and a fastener may be engaged through the orifice of the shank and may be engaged through a bore of the gasket. The shank includes an aperture having an inner diameter smaller than that of the orifice, a second gasket may be engaged into the chamber via the orifice of the shank and includes a bore aligned with the aperture of the shank.

4 Claims, 3 Drawing Sheets

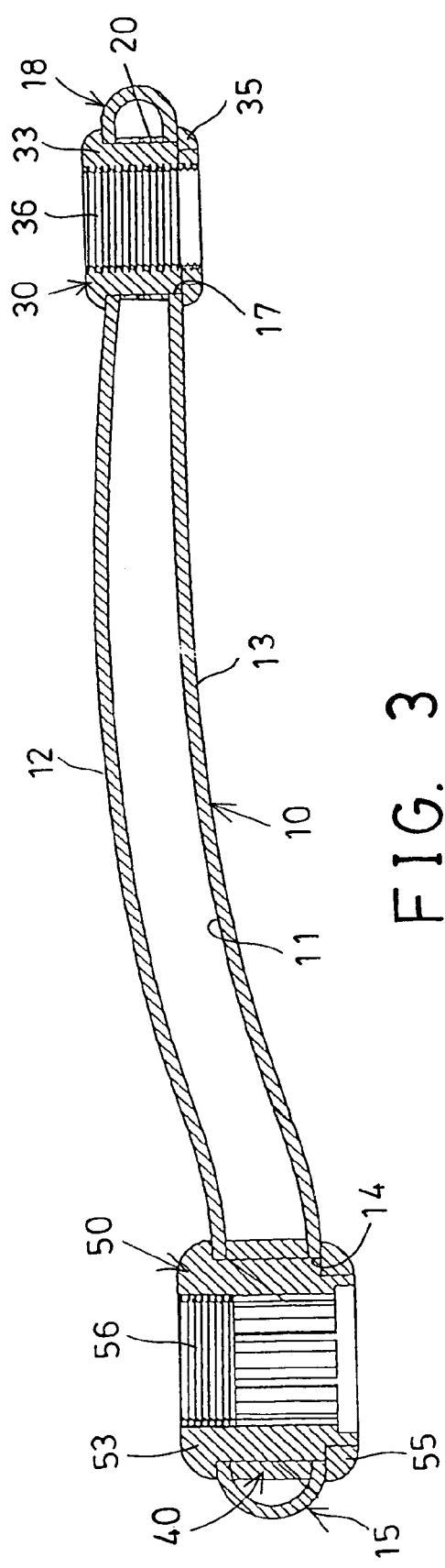
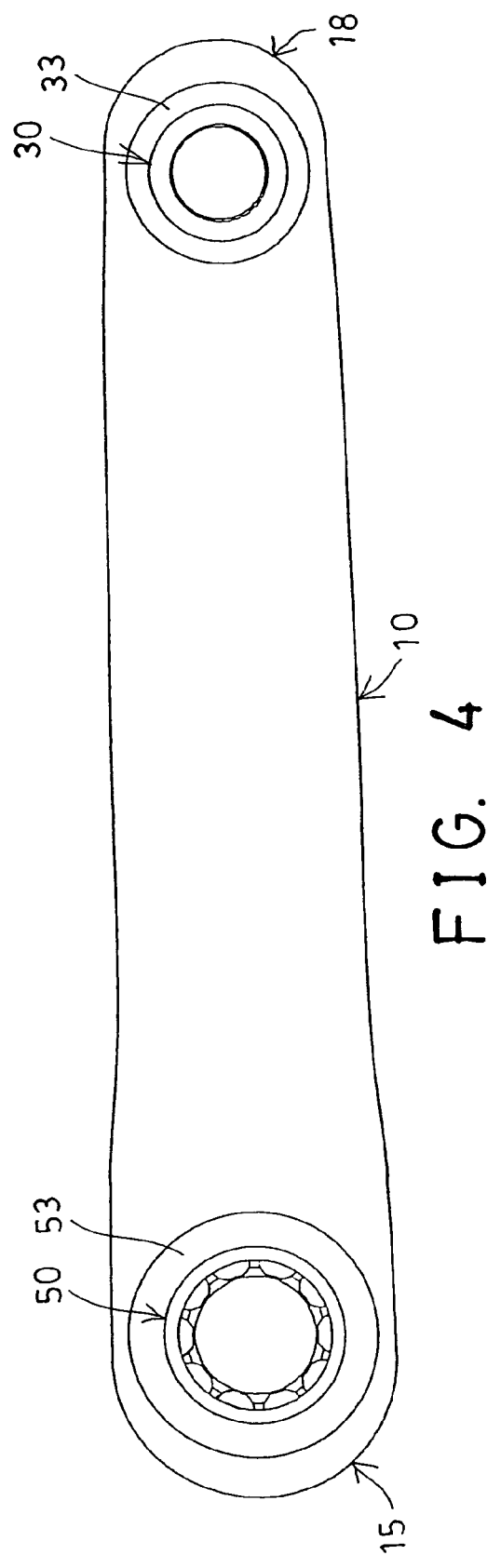
FIG. 3
FIG. 4

CRANK FOR CYCLES

BACKGROUND OF THE INVENTION

1. Field of the Invention

The present invention relates to a crank, and more particularly to a crank for bicycles or the like having a hollow structure and having a gasket engaged therein.

2. Description of the Prior Art

Typical cranks for bicycles or the like comprise an elongated crank body formed by molding or forging process and having a solid structure, and normally made of cast metal materials, that may have a great weight and that may greatly increase the weight of the cycles, such as unicycles, bicycles, tricycles, etc.

For example, U.S. Pat. No. 5,121,474 to Arregui Suinaga, and U.S. Pat. No. 4,521,207 to Husted disclose two of the typical cranks for bicycles or the like which also comprise an elongated crank body formed by molding or forging process and having a solid structure, and should also be made of cast metal materials, that may have a great weight and that may greatly increase the weight of the bicycles, or the like. The typical cranks for bicycles or the like failed to provide a hollow structure for reducing the weight of the cranks.

The present invention has arisen to mitigate and/or obviate the afore-described disadvantages of the conventional cranks for bicycles.

SUMMARY OF THE INVENTION

The primary objective of the present invention is to provide a crank for bicycles including a hollow structure for reducing the weight of the cycles.

The other objective of the present invention is to provide a crank for bicycles including a gasket engaged therein, for reinforcing the crank.

In accordance with one aspect of the invention, there is provided a crank for cycles including an elongate shank having an orifice formed therein, a chamber formed by an upper wall and a lower wall, and a gasket engaged into the chamber via the orifice of the shank, and may be provided for such as reinforcing the hollow shank.

The gasket is engaged between the walls of the shank, a fastener is engaged through the orifice of the shank and a bore of the gasket. The shank includes one or more teeth extended into the orifice, the gasket includes one or more teeth extended into the bore and aligned with the teeth of the shank, and the fastener includes one or more teeth engaged with the teeth of the shank and the gasket. The gasket includes one or more slots formed in an outer peripheral portion for increasing a resilience of the gasket and for allowing the gasket to be easily engaged into the chamber via the orifice of the shank.

The shank includes an aperture having an inner diameter smaller than that of the orifice, a second gasket is engaged into the chamber via the orifice and includes a bore aligned with the aperture of the shank. The shank includes one or more teeth extended into the aperture, the gasket includes one or more teeth extended into the bore and aligned with the teeth of the shank, a fastener is engaged through the aperture of the shank and the bore of the gasket, and includes one or more teeth engaged with the teeth of the shank and the gasket.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a cross sectional view of the crank for the bicycles; and

FIG. 4 is a top plan view of the crank for the bicycles.

DETAILED DESCRIPTION OF THE PREFERRED EMBODIMENT

Figure 1:
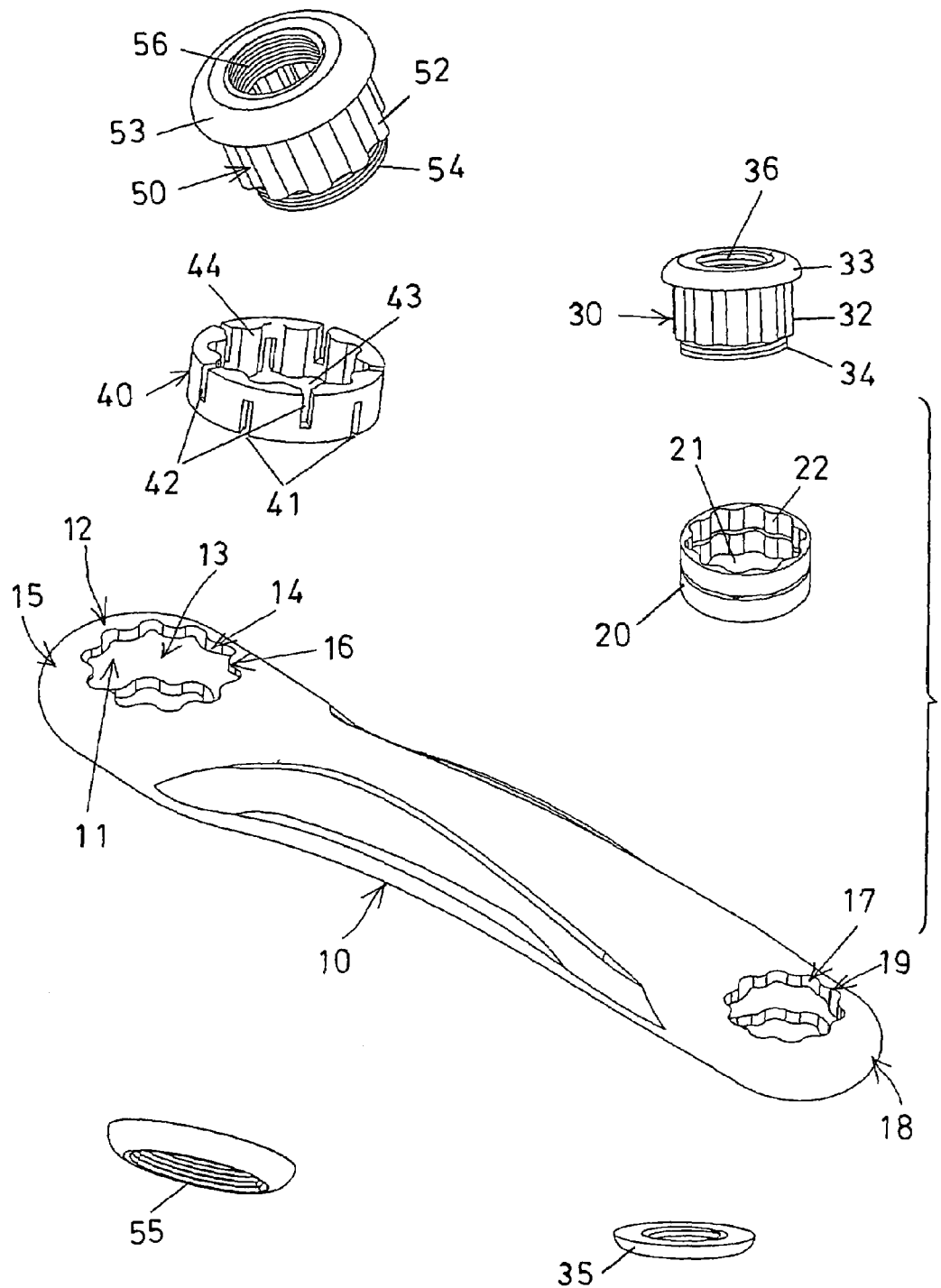
FIG. 1 is an exploded view of a crank for bicycles in accordance with the present invention.
Figure 2:
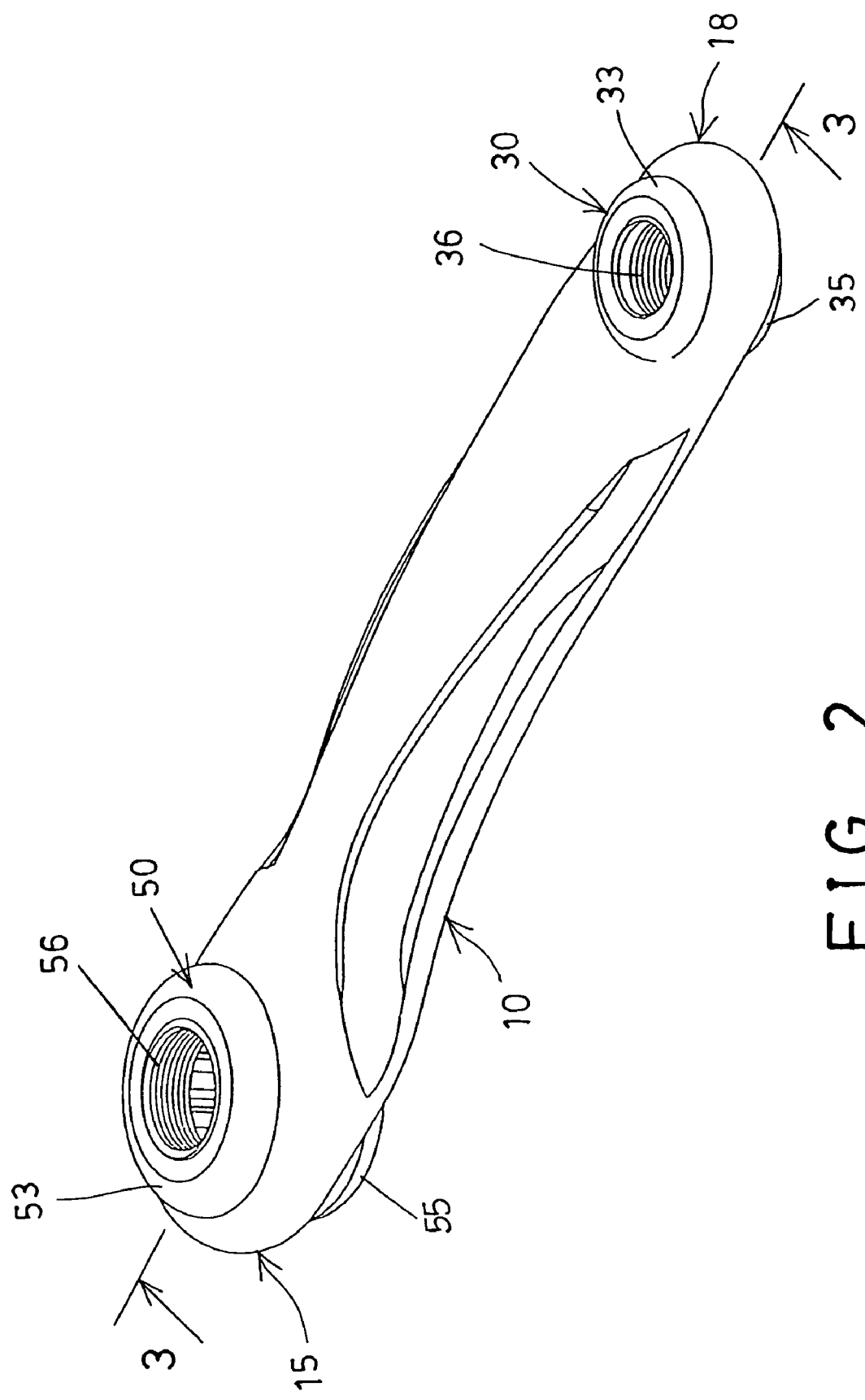
FIG. 2 is a perspective view of the crank for the bicycles.

Referring to the drawings, and initially to FIGS. 1-4, a crank for cycles in accordance with the present invention comprises an elongate shank 10 including a hollow chamber 11 formed therein and defined by an outer peripheral wall or an upper wall 12 and a lower wall 13, and including an orifice 14 formed in one end 15 thereof.

The elongate shank 10 further includes one or more teeth 16 extended into the orifice 14 thereof, and includes an aperture 17 formed in the other end 18 thereof, and further includes one or more teeth 19 extended into the aperture 17 thereof. It is preferable that the aperture 17 includes an inner diameter equals to, and preferably smaller than that of the orifice 14 of the shank 10.

A gasket 20 includes an outer diameter equals to or smaller than that of the orifice 14 but greater than that of the aperture 17 of the shank 10, for engaging into the chamber 11 via the orifice 14 of the shank 10, and includes a bore 21 having an outer diameter equals to that of the aperture 17 of the shank 10, and includes one or more teeth 22 extended into the bore 21 thereof and preferably aligned with the teeth 19 of the shank 10.

A fastener 30 is engaged through the aperture 17 of the shank 10 and engaged into the bore 21 of the gasket 20, and includes one or more teeth 32 engaged with the teeth 19, 22 of the shank 10 and the gasket 20, and includes a head 33 engaged with the shank 10, and includes a threaded end 34 for engaging with a lock nut 35, and includes a screw hole 36 formed therein.

Another gasket 40 includes an outer diameter greater than that of the orifice 14, and includes a number of slots 41, 42 formed in the outer peripheral portion thereof for allowing the gasket 40 to be squeezed and engaged into the chamber 11 via the orifice 14 of the shank 10 and retained between the walls 12, 13, in which some of the slots 41 are formed in the outer peripheral portion of the gasket 40 and faced downwardly, and the other slots 42 are formed in the outer peripheral portion of the gasket 40 and faced upwardly for increasing a resilience of the gasket 40, and for the allowing the gasket 40 to be engaged through the orifice 14 of the shank 10 and to be engaged into the chamber 11 of the shank 10. The gasket 40 includes a bore 43 formed therein and having an outer diameter equals to that of the orifice 14 of the shank 10, and includes one or more teeth 44 extended into the bore 43 thereof and aligned with the teeth 16 of the shank 10.

Another fastener 50 is engaged into or through the orifice 14 of the shank 10 and engaged into the bore 43 of the gasket 40, and includes one or more teeth 52 engaged with the teeth 16, 44 of the shank 10 and the gasket 40, and includes an enlarged head 53 engaged with the shank 10, and includes a threaded end 54 formed therein, for engaging with a lock nut 55, and includes a screw hole 56 formed therein.

It is to be noted that the elongate shank 10 includes a hollow chamber 11 formed therein, and may thus include a hollow structure for reducing the weight of the elongate shank and the bicycles, and may further include a gasket engaged therein, for reinforcing the elongate shank 10.

The conventional cranks fail to provide a shank 10 having a hollow chamber 11 formed therein, and one or more gaskets 20, 40 for engaging into the chamber 11 and retained between the walls 12, 13 of the shank 10.

Accordingly, the crank for bicycles in accordance with the present invention includes a hollow structure for reducing the weight of the cycles, and includes a gasket engaged therein, for reinforcing the crank.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A crank for bicycles comprising:

an elongate shank including a chamber formed therein and defined by an upper wall and a lower wall, and said shank including an orifice formed therein, and said shank including at least one tooth extended into said orifice of said shank, a gasket including a plurality of slots formed in an outer peripheral portion of said gasket, some of said slots being faced downwardly, and the other slots faced upwardly for increasing a resilience of said gasket and for allowing said gasket to be engaged through said orifice of said shank and to be engaged into said chamber of said shank, and said gasket being engaged between said upper and said lower walls of said shank, said gasket including a bore formed therein and including at least one tooth extended into said bore of said gasket and aligned with said at least one tooth of said shank, a fastener being engaged through said orifice of said shank and engaged through said bore of said gasket and including at least one tooth engaged with said at least one tooth of said shank and said gasket.

2. A crank for bicycles comprising:

an elongate shank including a chamber formed therein and defined by an upper wall and a lower wall, and said shank including an orifice formed therein, and said shank including an aperture formed therein and having an inner diameter smaller than that of said orifice thereof, a gasket including a plurality of slots formed in an outer peripheral portion of said gasket, some of said slots being faced downwardly, and the other slots faced upwardly for increasing a resilience of said gasket and for allowing said gasket to be engaged through said orifice of said shank and to be engaged into said chamber of said shank, and said gasket being engaged between said upper and said lower walls of said shank, and a second gasket being engaged into said chamber via said aperture of said shank and including a bore aligned with said aperture of said shank.

3. The crank as claimed in claim 2, wherein said shank includes at least one tooth extended, into said aperture thereof, said second gasket includes at least one tooth extended into said bore thereof and aligned with said at least one tooth of said shank.

4. The crank as claimed in claim 3 further comprising a fastener engaged through said aperture of said shank and said bore of said gasket, and including at least one tooth engaged with said at least one tooth of said shank and said second gasket.

* * * * *